(12) United States Patent
Benhase et al.

(10) Patent No.: US 8,719,529 B2
(45) Date of Patent: May 6, 2014

(54) STORAGE IN TIERED ENVIRONMENT FOR COLDER DATA SEGMENTS

(75) Inventors: Michael T. Benhase, Tucson, AZ (US);
Lokesh M. Gupta, Tucson, AZ (US);
Carol S. Mellgren, Tucson, AZ (US);
Alfred E. Sanchez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 13/007,465

(22) Filed: Jan. 14, 2011

(65) Prior Publication Data

US 2012/0185648 A1 Jul. 19, 2012

(51) Int. Cl.
*G06F 13/00* (2006.01)

(52) U.S. Cl.
USPC .................................. 711/165; 711/E12.006

(58) Field of Classification Search
CPC ................................. G06F 12/00; G06F 13/00
USPC .................................................. 711/113, 159
See application file for complete search history.

(56) References Cited

U.S. PATENT DOCUMENTS

| | | | |
|---|---|---|---|
| 6,092,071 A | 7/2000 | Bolan et al. | |
| 6,317,747 B1 | 11/2001 | Bolan et al. | |
| 6,925,527 B2 * | 8/2005 | Okada et al. | 711/113 |
| 7,103,740 B1 | 9/2006 | Colgrove et al. | |
| 7,225,211 B1 | 5/2007 | Colgrove et al. | |
| 7,765,377 B2 | 7/2010 | Friauf et al. | |
| 7,987,162 B2 * | 7/2011 | Aston et al. | 707/693 |
| 8,166,260 B2 * | 4/2012 | Prabhu et al. | 711/161 |
| 2003/0079081 A1 * | 4/2003 | Okada et al. | 711/113 |
| 2005/0132161 A1 * | 6/2005 | Makela et al. | 711/170 |
| 2008/0154986 A1 | 6/2008 | Kavuri et al. | |
| 2008/0168228 A1 | 7/2008 | Carr et al. | |
| 2008/0307191 A1 | 12/2008 | Lane et al. | |
| 2010/0077168 A1 | 3/2010 | Arakawa | |
| 2010/0082765 A1 | 4/2010 | Murase | |
| 2010/0228800 A1 * | 9/2010 | Aston et al. | 707/822 |
| 2010/0274983 A1 * | 10/2010 | Murphy et al. | 711/162 |
| 2011/0191558 A1 * | 8/2011 | Anderson et al. | 711/162 |
| 2012/0158647 A1 * | 6/2012 | Yadappanavar et al. | 707/609 |
| 2013/0073798 A1 * | 3/2013 | Kang et al. | 711/103 |

OTHER PUBLICATIONS

Abramson, Ian "Oracle Database 11g: a Beginners Guide" Oracle Press (Dec. 8, 2008) pp. 386.*

* cited by examiner

*Primary Examiner* — Sean D Rossiter
(74) *Attorney, Agent, or Firm* — Griffiths & Seaton PLLC

(57) ABSTRACT

Exemplary system and computer program embodiments for storing data by a processor device in a computing environment are provided. In one embodiment, by way of example only, from a plurality of available data segments, a data segment having a storage activity lower than a predetermined threshold is identified as a colder data segment. A chunk of storage is located to which the colder data segment is assigned. The colder data segment is compressed. The colder data segment is migrated to the chunk of storage. A status of the chunk of storage is maintained in a compression data segment bitmap.

11 Claims, 6 Drawing Sheets

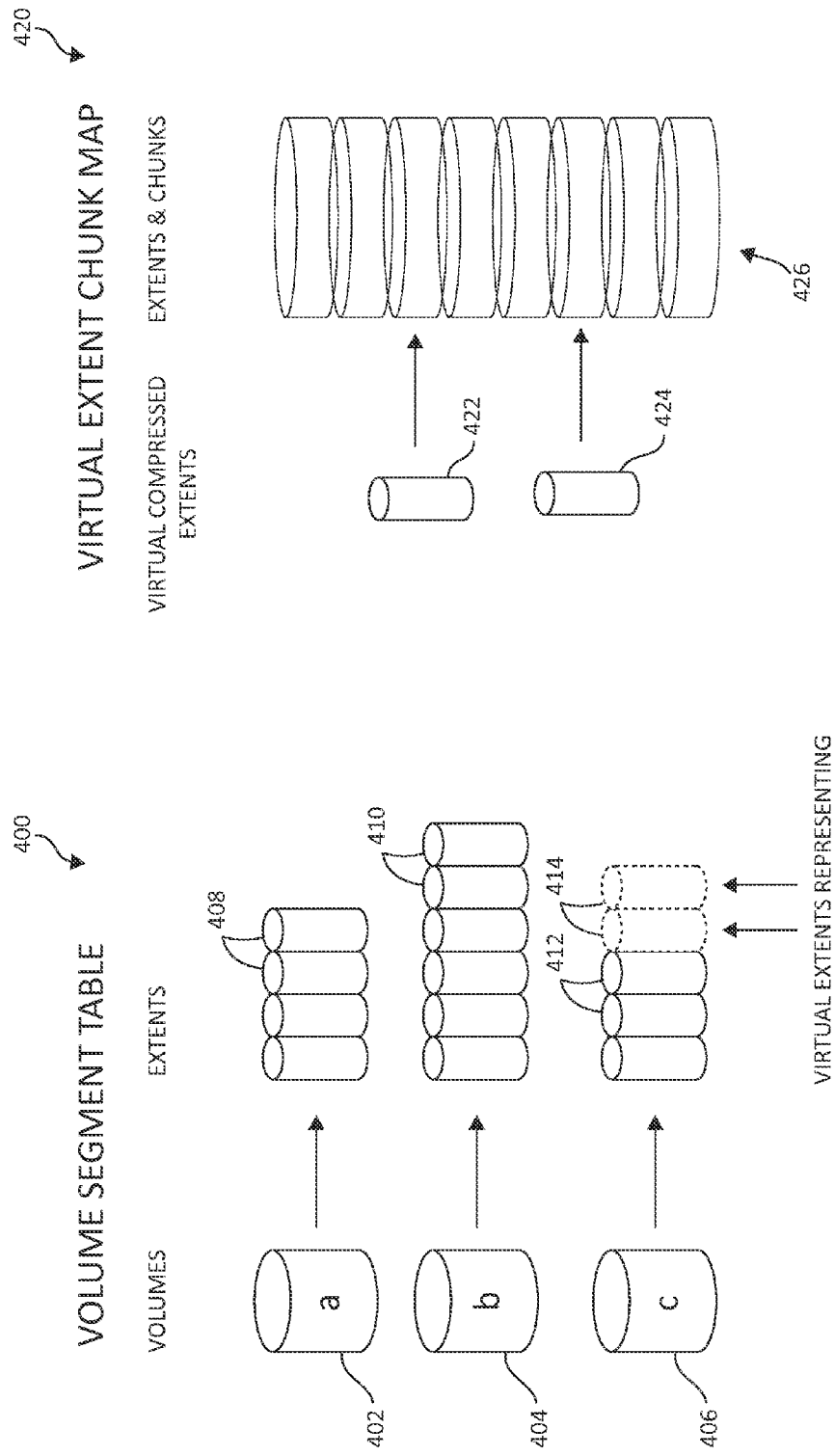

STORAGE IN TIERED ENVIRONMENT FOR COLDER DATA SEGMENTS

BACKGROUND OF THE INVENTION

1. Field of the Invention

The present invention relates in general to computers, and more particularly to apparatus and computer program product embodiments for data storage in tiered storage environments for colder data segments.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Current tiered-storage architectures, as described above, include a variety of storage mediums. These may include such media as enterprise hard disk drives (HDD), serial advanced technology attachment (SATA) disk drives, solid state drives (SSD), tape drives, and other devices. Data may be migrated between such devices. Placement of certain kinds of data in the appropriate medium may greatly enhance overall performance of the storage environment.

In some tiered storage environments, a heat map of data segments (such as extents) is created by counting the number of accesses to the segments. The data segments are then organized into so-called "hot" and "cold" categories. Most likely, the hot data is placed on the fastest medium (e.g., SSD), and the cold data will be placed on a slower, more cost effective medium (e.g., SATA). However, the data segments that have not been accessed in a very long time generally remain in the cold category. As this cold data ages and grows, more disk space may be needed to accommodate this growth, thus increasing the cost of maintaining this data. A current solution to curb this cost is to migrate the coldest data to a more cost effective medium, such as tape, or leave the data in its current location, furthering the need for additional disk space.

Migrating the coldest data to tape presents complexities. Identification of the appropriate cold data may be difficult under current regimes. When presented with this scenario, users may turn to extremes, by migrating all cold data, or not migrating the cold data at all. If all cold data is indeed migrated off of a particular storage controller to tape, and is later needed, staging the data back to the storage controller may consume time and other resources.

In view of the foregoing, a need exists for a mechanism to identify extremely cold data, decreasing the cost per unit of storage (e.g., cost per GB), and improve the accessibility of the extremely cold data. Accordingly, and in view of the foregoing, various system, method, and computer program product embodiments for storing data by a processor device in a computing environment are provided. In one embodiment, by way of example only, from a plurality of available data segments, a data segment having a storage activity lower than a predetermined threshold is identified as a colder data segment. A chunk of storage is located to which the colder data segment is assigned. The colder data segment is compressed. The colder data segment is migrated to the chunk of storage. A status of the chunk of storage is maintained in a compression data segment bitmap.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIGS. 4A and 4B illustrate additional exemplary data structures in which aspects of the illustrated embodiments may be implemented;

DETAILED DESCRIPTION OF THE DRAWINGS

The illustrated embodiments provide mechanisms for management (including data movement, compression, and file maintenance aspects) of data segments (such as extents) having low use characteristics, such as low input/output (I/O) activity. Such data segments are referred to herein as "extremely cold" data segments, and further throughout the claimed subject matter as cold data segments exhibiting storage activity below a predefined threshold. The mechanisms of the illustrated embodiments define methodologies for compressing and migrating such extremely cold data segments to a set of pre-allocated data segments. While one illustrated embodiment depicts a tiered storage environment having SSD devices among a variety of storage devices configured in a tiered arrangement, one of ordinary skill in the art will appreciate that the mechanisms of the present invention are contemplated to be implementable in a variety of computing storage environments.

The mechanisms of the illustrated embodiments may be made identify this extremely cold data as will be further described, by examining data segments that have various characteristics below a predefined threshold, such as input/output (I/O) activity. Such identification may be performed in the storage controller itself, reducing any guess work that would otherwise need to performed by storage administrators to migrate and/or archive this data. Pursuant to the mechanisms of the illustrated embodiments, as will be further described, the colder data segments may be subject to a compression scheme, which results in a reduction of disk space, and can be used to increase the efficiency of the current storage. Accordingly, the necessity to add more storage or add external archive storage, such as tape storage, is also reduced, as more data fits in the same amount of disk space.

The mechanisms of the illustrated embodiments may be used, again as will be further described, to automatically migrate the extremely cold data from normal data segments to compressed data segments. When compressed data needs to be accessed, the mechanisms of the illustrated embodiments may be used to migrate the compressed data segment to a fully allocated data segment. Any potential overhead compression adds to the migration procedure is minimal, as performing I/O operations to associated devices adds overhead of an order of magnitude higher.

Figure 1:
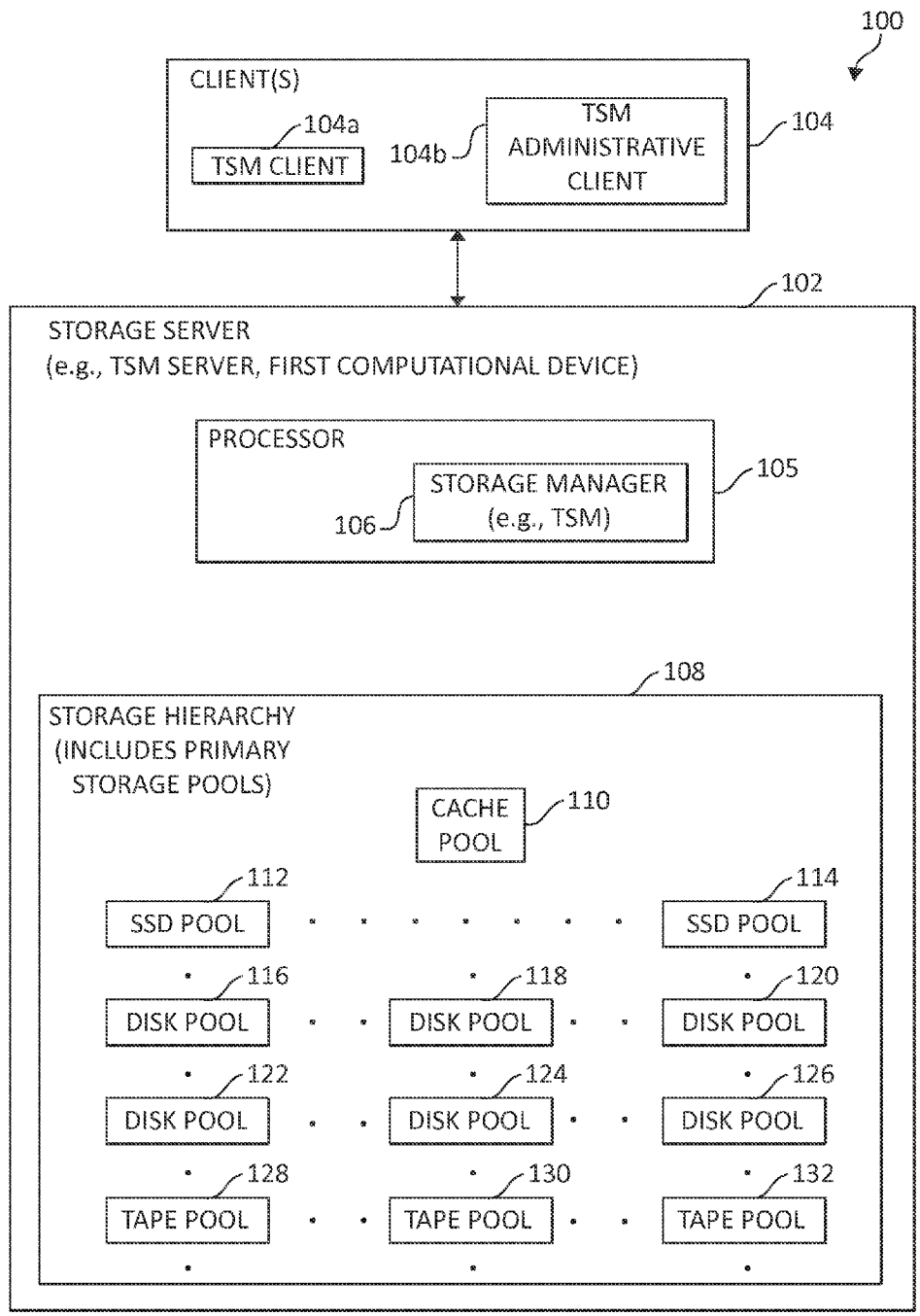
FIG. 1 illustrates a block diagram of an exemplary computing storage environment in accordance with certain embodiments.

Turning now to FIG. 1, a block diagram of a computing storage environment 100 in accordance with certain embodiments is illustrated. The computing storage environment 100 includes a first computational device, such as, a storage server 102, coupled to one or more computational devices, such as, clients 104. In certain embodiments, the storage server 102 and the clients 104 may comprise any suitable computational device, including those presently known in the art, such as, a personal computer, a workstation, a mainframe, a midrange computer, a network appliance, a palm top computer, a telephony device, a blade computer, a hand held computer, etc.

In some embodiments, a storage manager 106, such as, the Tivoli® Storage Manager® (TSM) product marketed by International Business Machines (IBM®) Corporation, may be used for securely storing and managing data segments according to aspects of the present invention. The storage manager 106 may execute in a storage management server, such as a TSM server 102 or elsewhere. In one embodiment, the storage manager is operable by and/or in conjunction with processor device 105 as shown. One of ordinary skill in the art will appreciate that various other configurations of the processor 105, storage manager 106, and related additional processing and/or memory components are contemplated. IBM, Tivoli, and Tivoli Storage Manager are trademarks or registered trademarks of IBM Corporation.

The TSM may provide data storage services to clients, such as TSM clients 104a, for management of data. The TSM server 102 may store files sent to the TSM server 102 by one or more TSM clients 104a. The storage manager 106 and/or processor device 105 may allow a system administrator to configure storage pools, where a storage pool comprises a group of devices used for storing data received from the TSM client 104a. Storage pools are used as targets for store operations from the TSM client 104a and are referenced in TSM server policies and other constructs for processing.

As shown, a variety of storage devices may be organized into a storage hierarchy. Storage media within the storage hierarchy may thus be grouped into data structures referred to herein as storage pools. The storage hierarchy may be organized to correspond with one or more metrics, such as a performance metric including write or read speeds. The storage hierarchy 108 as shown may be organized such that the top of the hierarchy may include a cache pool 110 having a highest amount or quality of a particular performance metric. Below the cache pool 110, a number of solid state drive (SSD) class devices may be organized into SSD pools by the same, similar, or other metrics (e.g., SSD pools 112 and 114).

Below the SSD pools 112 and 114, a first tier of disk pools (e.g., disk pools 116, 118, and 120) may be then organized. As one of ordinary skill in the art will appreciate, disk pools 116, 118, and 120 may include a variety of disk devices such as pools of enterprise disk drives, SATA disk drives, disk devices configured in a particular redundant array of independent disks (RAID) configuration, and the like.

The first tier of disk pools may be located above a second tier of disk pools (e.g., pools 122, 124, and 126) by virtue of exhibiting a greater amount, stronger attribute or attributes, or quality of the performance metric. Below the second tier of disk pools, an additional tier of tape pools (e.g., tape pools 128, 130, and 132) may then be organized. Various considerations for the organization of such storage hierarchies 108 may be apparent to one of ordinary skill in the art. In one embodiment, the system administrator may assist in performing such configurations in the storage hierarchy 108 by inputs to the TSM administrative client 104b or another mechanism. While tape pools 128, 130, and 132 are shown within the storage hierarchy 108 as shown, it should be noted that generally such tape pools are found in a storage subsystem external to those pools ranking higher in the hierarchy.

Figure 2:
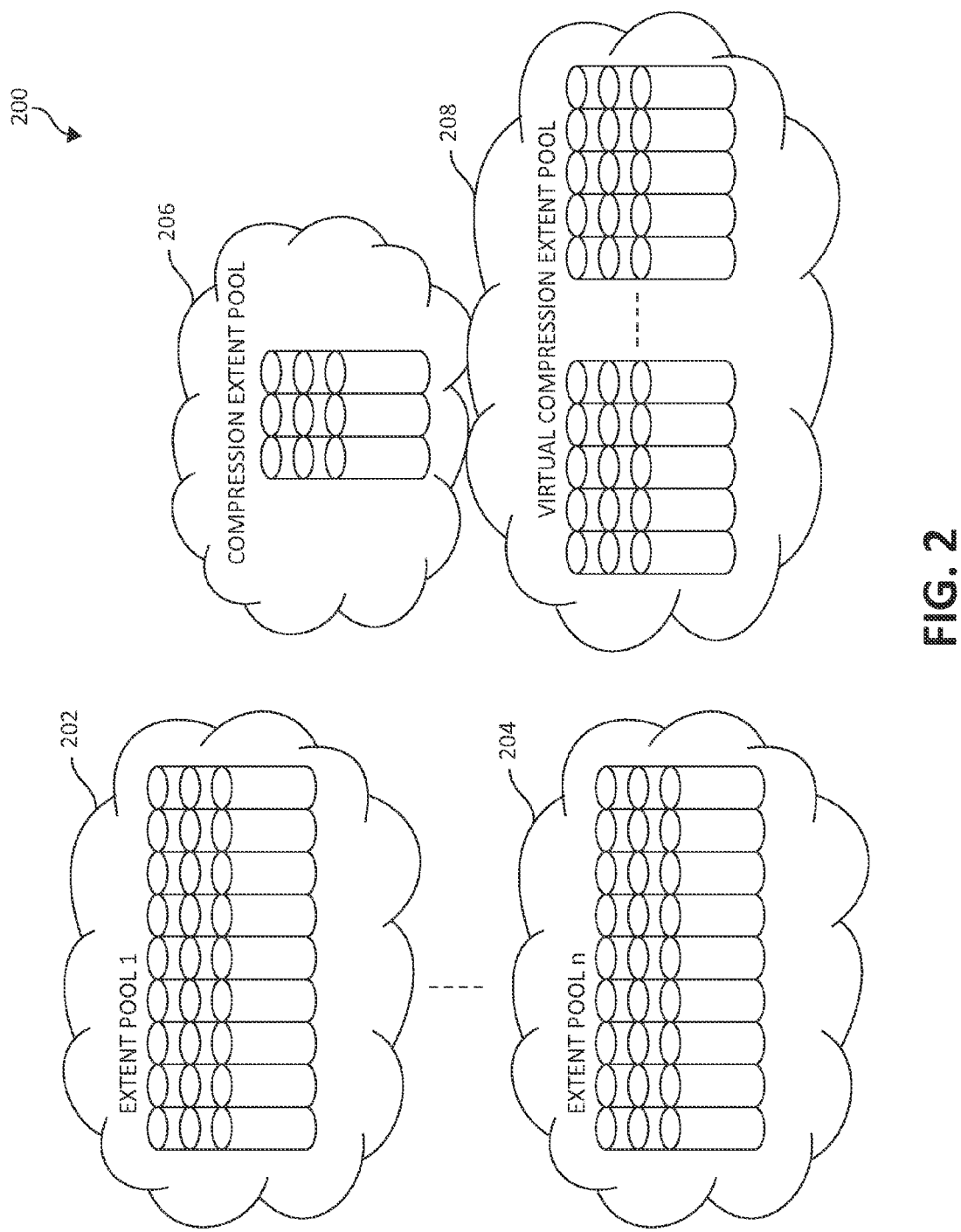
FIG. 2 illustrates exemplary pools of data structures in which aspects of the illustrated embodiments and following claimed subject matter may be implemented.

FIG. 2, following, illustrates exemplary pools of data structures 200 in which aspects of the illustrated embodiments and following claimed subject matter may be implemented. The data structures 200 may be operable in the exemplary storage server 102 depicted in FIG. 1, previously, or in other storage environments known to one of ordinary skill in the art. First, a number of data segments, here illustrated as extents, are organized into a number of extent pools, numbered 1 to n (e.g., extent pool 202 and 204). The extent pools 202 and 204 may be associated with disk pools 116, 118, and 120, for example, and organized by the storage manager 106 (see again, FIG. 1).

In addition to the extent pools 202 and 204 as shown, the mechanisms of the illustrated embodiments are operable to implement a compression extent pool 206, and a virtual compression extent pool 208 as shown. The compression extent pool 206, in one embodiment, is a new pool of 1 GB extents, which may be defined by a user. In one embodiment, the compression extent pool may be associated with the slower-spinning disk medium in pools 122, 124, and 126 (again, FIG. 1) such as serial advanced technology attachment (SATA) disk devices. In one embodiment, each extent in the compression extent pool may be divided into 128 MB chunks.

Figure 3A:
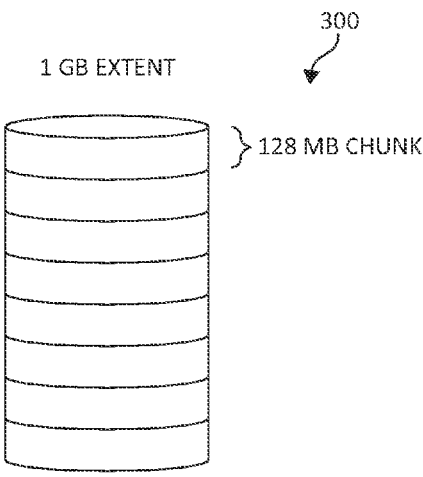
FIGS. 3A and 3B illustrate exemplary data structures in which aspects of the illustrated embodiments may be implemented.

The virtual compression extent pool 208 is a group of virtual extents that represent a compressed extent. In one embodiment, the extents are virtual in the sense that they represent a group of 128 MB chunks from the compression extent pool 206. Again, in one embodiment, the number of extents in the virtual compression extent pool 208 is eight times (1 GB/128 MB chunks) the number of extents in the compression extent pool 206. This is illustrated further in FIG. 3A, following, where a portion 300 of the compression extent pool 206 is shown as a 1 GB extent. The portion 300 of the compression extent pool may be divided into 128 MB chunks 302 as shown.

Figure 3B:
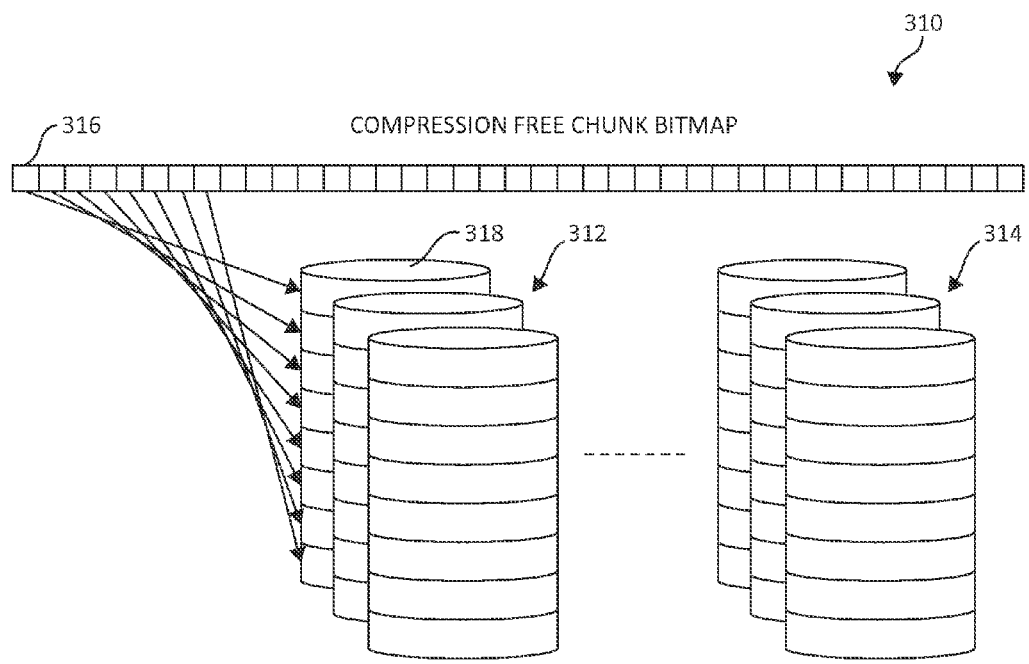

Turning now to FIG. 3B, a compression free chunk bitmap 310 is shown as an exemplary microcode data structure in which aspects of illustrated embodiments may be implemented. The compression free chunk bitmap 310 is a data structure where each bit (i.e., bit 316) represents, in one embodiment, a 128MB chunk from the compression extent pool 206 (FIG. 3A) (i.e., chunk 318) in portion 312. Portions 312-314, as shown, represent the range of data in the compression extent pool 206.

Turning now to FIGS. 4A and 4B, additional exemplary data structures are illustrated, in which aspects of the illustrated embodiments maybe implemented. First, in FIG. 4A, an exemplary volume segment table (VST) 400 is shown, which maps portions (in this case, volumes 401, 404 and 406) of storage to a number of extents (eg., 408, 410, and 412). In addition, the VST 400 may be adapted to map to virtualized elements such as virtual extents 414 representing compressed extents as shown. In FIG. 4B, following, an exemplary virtual extent chunk map 420 is illustrated, which, in one embodiment, maps virtual compressed extents (e.g., virtual compressed extents 422, and 424) to compressed physical extents (e.g., extents 426), along with an offset (chunk) and length (amount of chunk consumed).

Figure 5A:
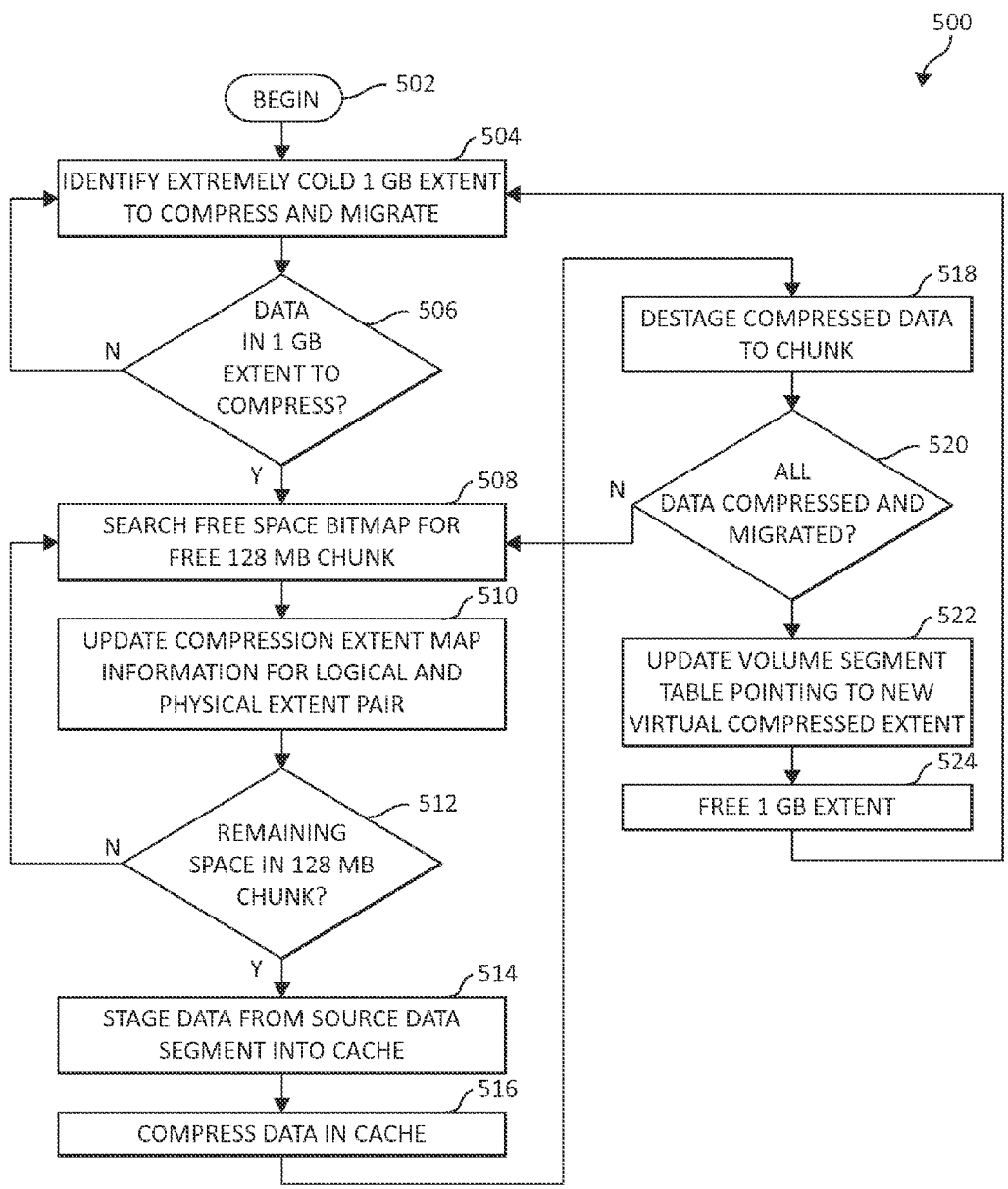
FIG. 5A illustrates an exemplary method for migration and compression of extremely cold data according to various aspects of the illustrated embodiments.
Figure 5B:
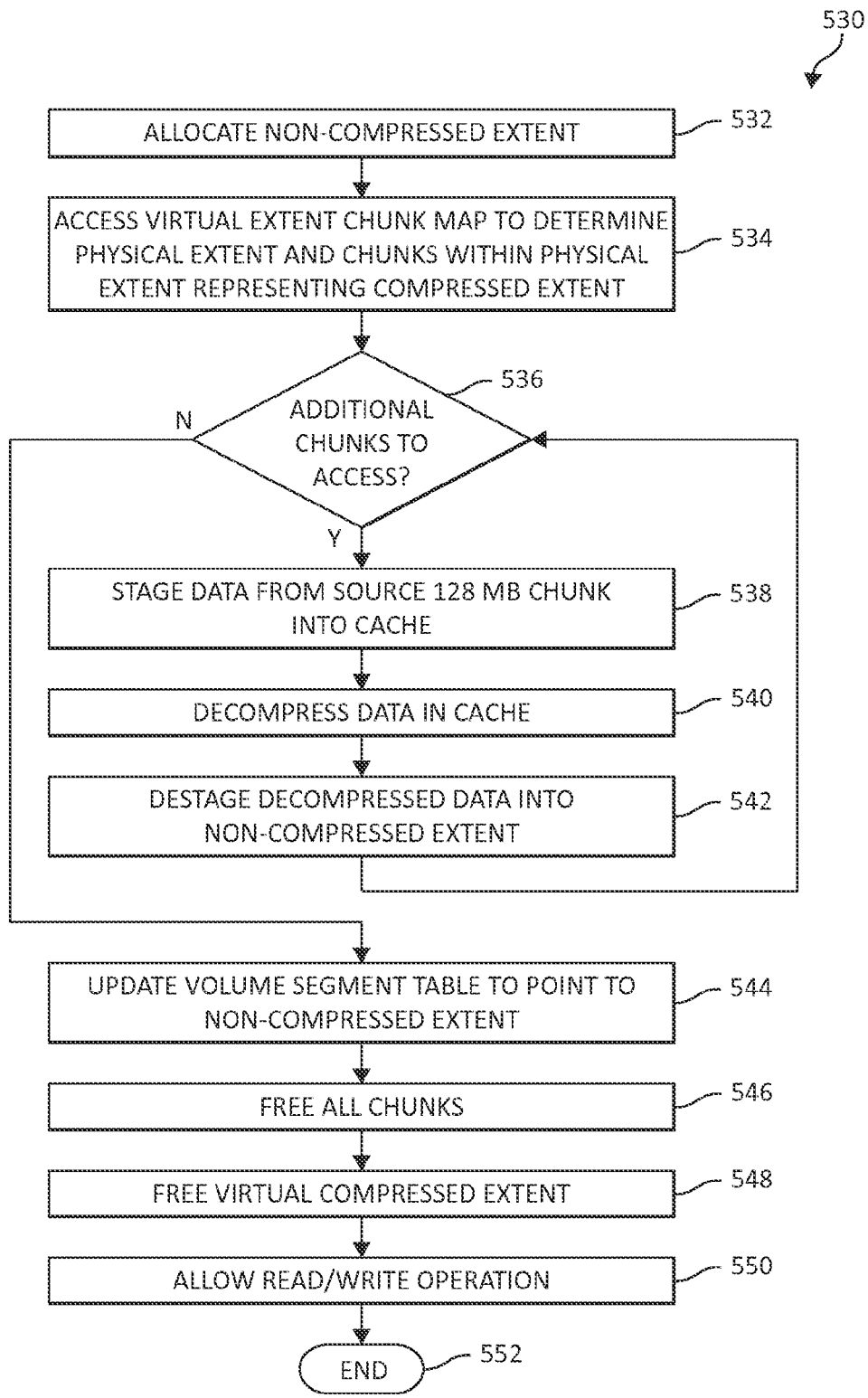
FIG. 5B illustrates an exemplary method for data access of extremely cold data according to various aspects of the illustrated embodiments.

Turning to FIG. 5A and 5B, exemplary methods 500, 530 for storing data (including migration and compression management) are depicted. As one of ordinary skill in the art will appreciate, various steps in the methods 500, 530 may be implemented in differing ways to suit a particular application. In addition, the described methods 500, 530 may be implemented by various means, such as hardware, software, firmware, or a combination thereof operational on or otherwise associated with the computing storage environment. The methods 500, 530, may be implemented by components such as those of the storage server 102 depicted in FIG. 1, previously. As another example, the methods 500, 530 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. While methods 500, 530 depict the maintenance of data segments as expressed in extents, one of ordinary skill in the art will appreciate that other data segments and storage mechanisms may be used in similar fashion.

Turning first to FIG. 5A, an exemplary method 500 for identification, compression and migration of colder data segments is depicted, in which aspects of the illustrated embodiments may be implemented. Method 500 begins (step 502), by identifying an extremely cold 1 GB extent to compress and migrate (step 504). The identification may proceed, in one embodiment, as described previously, where various storage characteristics may be examined (such as the aforementioned examination of I/O activity falling below a predetermined threshold). Once the extent is identified, the method 500 queries if data remains in the extent to compress (step 506). If so, the method 500 continues to step 508, where the applicable free space bitmap is searched for a free 128 MB chunk. The compression extent map is updated with information for the associated logical and physical extent pair (step 510).

As a following step, the method 500 queries if space remains in the 128 MB chunk (step 512). If yes, the method 500 moves to step 514. Alternatively, the method 500 returns to step 508 as shown. In step 514, the data from the 128 MB chunk is staged into cache 514. The data is compressed in cache (step 516), and the compressed data is then destaged to the associated compressed chunk in the virtual compressed extent (step 518). If all data has been compressed and migrated (step 520), the method 500 moves to step 522. Alternatively, the method 500 returns to step 508.

In step 522, the volume segment table (VST) is updated to point to the new virtual compressed extent. The 1 GB extent is then freed (step 524). The method 500 then returns to step 504 to identify an additional extremely cold 1 GB extent to compress and migrate.

FIG. 5B, following, illustrates an exemplary method 530 for data access for migrated, extremely cold data segments, again in which aspects of the illustrated embodiments may be implemented. Method 530 begins (step 531) by, pursuant to a request for data access, allocating a non-compressed extent where the data will eventually be moved (step 532). The virtual extent chunk map is then accessed to determine the location of the physical extent and chunks within the physical extent representing the compressed extent (step 534). If additional chunks are to be accessed (step 536), the method 530 stages the migrated data from the source, 128 MB chunk into cache (step 538).

As a following step, the data is decompressed in the cache (step 540). The decompressed data is destaged into the allocated non-compressed extent (step 542), and the method 500 returns to step 536. If no additional chunks are to be accessed, the method 530 updates the VST to point to the non-compressed extent (step 544), frees all the respective chunks (step 546), the associated virtual compressed extent (step 548), and allows the I/O operation (step 550). The method 530 then ends (step 552).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for storing data in a computing environment, comprising:
    at least one processor device, operable in the computing environment, wherein the at least one processor device is further adapted for:
        identifying, from a plurality of available data segments, a data segment having an storage activity lower than a predetermined threshold as a colder data segment,
        determining if the data exists in the data segment to compress,
        locating a chunk of storage using a compression data segment bitmap to which the colder data segment is assigned,
        compressing the colder data segment,
        migrating the colder data segment to the chunk of storage; wherein a status of the chunk of storage is maintained in the compression data segment bitmap,
        updating the compression data segment bitmap with information representative of a logical and physical portion of the colder data segment,
        staging the colder data segment into cache,
        updating a volume segment table (VST) pointing to the colder data segment represented as a new virtual compressed data segment, and
        upon an input/output (I/O) operation directed to the colder data segment, performing each one of:
            allocating a non-compressed data segment,
            accessing a virtual extent data segment map to determine the physical portion of the data segment and chunks within the physical portion of the data segment representing the virtual compressed data segment, and
            determining if additional chunks are to be accessed, and, if the additional chunks are to be accessed, performing each one of:
                updating the VST to point to the non-compressed data segment,
                freeing each of the chunks,
                freeing the virtual compressed data segment, and
                allowing the I/O operation.

2. The system of claim 1, wherein the compressing the colder data segment is performed in the cache.

3. The system of claim 1, wherein the at least one processor device is further adapted for identifying, from a plurality of available data segments, a 1 gigabyte (GB) data segment having the storage activity lower than the predetermined threshold as the colder data segment.

4. The system of claim 3, wherein the at least one processor device is further adapted for, for each of the chunks within the physical portion of the data segment:
    staging data from a selected one of the chunks into the cache,
    decompressing the data in the cache, and
    destaging the decompressed data into the non-compressed data segment.

5. The system of claim 4, wherein the at least one processor device is further adapted for searching for a free 12 megabyte (MB) chunk of the storage using a compression data segment bitmap to which the colder data segment is assigned.

6. The system of claim 1, wherein the colder data segment is an extent.

7. The system of claim 1, wherein the at least one processor device is a storage management processor (SMP).

8. A computer program product for storing data by a processor device in a computing environment, the computer program product comprising a non-transitory computer-readable storage medium having computer-readable program code portions stored therein, the computer-readable program code portions comprising:

a first executable portion for identifying, from a plurality of available data segments, a data segment having an storage activity lower than a predetermined threshold as a colder data segment;

a second executable portion for determining if the data exists in the data segment to compress;

a third executable portion for locating a chunk of storage to which the colder data segment is assigned;

a fourth executable portion for compressing the colder data segment;

a fifth executable portion for migrating the colder data segment to the chunk of storage; wherein a status of the chunk of storage is maintained in a compression data segment bitmap;

a sixth executable portion for updating the compression data segment bitmap with information representative of a logical and physical portion of the colder data segment;

a seventh executable portion staging the colder data segment into cache;

an eighth executable portion for updating a volume segment table (VST) pointing to the colder data segment represented as a new virtual compressed data segment; and a ninth executable portion for, upon an input/output (I/O) operation directed to the colder data segment, performing each one of:

allocating a non-compressed data segment, accessing a virtual extent data segment map to determine the physical portion of the data segment and chunks within the physical portion of the data segment representing the virtual compressed data segment, and determining if additional chunks are to be accessed, and, if the additional chunks are to be accessed, performing each one of:

updating the VST to point to the non-compressed data segment, freeing each of the chunks, freeing the virtual compressed data segment, and allowing the I/O operation.

9. The computer program product of claim 8, further including a tenth executable portion for identifying, from a plurality of available data segments, a 1 gigabyte (GB) data segment having the storage activity lower than the predetermined threshold as the colder data segment.

10. The computer program product of claim 9, further including an eleventh executable portion for, for each of the chunks within the physical portion of the data segment:

staging data from a selected one of the chunks into the cache, decompressing the data in the cache, and destaging the decompressed data into the non-compressed data segment.

11. The computer program product of claim 10, further including a twelfth executable portion for searching for a free 12 megabyte (MB) chunk of the storage using a compression data segment bitmap to which the colder data segment is assigned.

* * * * *